(12) United States Patent
Kim

(10) Patent No.: US 8,502,769 B2
(45) Date of Patent: Aug. 6, 2013

(54) UNIVERSAL INPUT DEVICE

(75) Inventor: Yong-duck Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 865 days.

(21) Appl. No.: 11/764,423

(22) Filed: Jun. 18, 2007

(65) Prior Publication Data

US 2008/0088468 A1 Apr. 17, 2008

(30) Foreign Application Priority Data

Oct. 16, 2006 (KR) .................. 10-2006-0100330

(51) Int. Cl.
G09G 5/00 (2006.01)
(52) U.S. Cl.
USPC ........... 345/156; 345/157; 345/168; 345/173; 345/169; 463/37; 463/38
(58) Field of Classification Search
USPC ......... 345/163, 166, 156–159, 169, 173–174; 715/863; 463/37–38
See application file for complete search history.

(56) References Cited

U.S. PATENT DOCUMENTS

| 5,570,113 | A | * | 10/1996 | Zetts | 345/173 |
|---|---|---|---|---|---|
| 5,581,484 | A | * | 12/1996 | Prince | 702/150 |
| 5,666,113 | A | * | 9/1997 | Logan | 341/34 |
| 5,850,212 | A | * | 12/1998 | Nishibori | 345/160 |
| 6,266,050 | B1 | * | 7/2001 | Oh et al. | 345/173 |
| 6,266,061 | B1 | * | 7/2001 | Doi et al. | 715/863 |
| 6,347,998 | B1 | * | 2/2002 | Yoshitomi et al. | 463/42 |
| 6,380,929 | B1 | * | 4/2002 | Platt | 345/173 |
| 6,388,657 | B1 | * | 5/2002 | Natoli | 345/168 |
| 6,600,480 | B2 | * | 7/2003 | Natoli | 345/168 |
| 6,603,420 | B1 | * | 8/2003 | Lu | 341/176 |
| 6,717,573 | B1 | * | 4/2004 | Shahoian et al. | 345/161 |
| 6,781,570 | B1 | * | 8/2004 | Arrigo et al. | 345/158 |
| 6,972,749 | B2 | * | 12/2005 | Hinckley et al. | 345/173 |
| 7,042,438 | B2 | * | 5/2006 | McRae et al. | 345/156 |
| 7,079,116 | B2 | * | 7/2006 | Park et al. | 345/163 |
| 7,142,197 | B2 | * | 11/2006 | Wang et al. | 345/179 |
| 7,173,604 | B2 | * | 2/2007 | Marvit et al. | 345/156 |
| 7,212,189 | B2 | * | 5/2007 | Shaw et al. | 345/163 |
| 7,423,631 | B2 | * | 9/2008 | Shahoian et al. | 345/163 |
| 7,477,233 | B2 | * | 1/2009 | Duncan et al. | 345/156 |
| RE40,808 | E | * | 6/2009 | Shahoian et al. | 345/161 |
| 7,654,459 | B2 | * | 2/2010 | Orsley et al. | 235/427 |
| 7,676,754 | B2 | * | 3/2010 | Basson et al. | 715/762 |

(Continued)

FOREIGN PATENT DOCUMENTS

JP 9-114582 5/1997
JP 11345082 A 12/1999

(Continued)

Primary Examiner — Lun-Yi Lao
Assistant Examiner — Kelly B Hegarty
(74) Attorney, Agent, or Firm — Jefferson IP Law, LLP

(57) ABSTRACT

A universal input device to attach to a target of a user, including a motion detector to detect motion of the target, a contact detector to detect types of contacts with the target, a controller to generate position data corresponding to the motion and control data, including mode setting data to set a mode of the device, corresponding to the types of the contacts, a communicator which transmits the position and the control data to an external host device, and a casing, accommodating the motion detector, the contact detector, the communicator, and the controller, into which the target is inserted.

19 Claims, 5 Drawing Sheets

(56) References Cited

U.S. PATENT DOCUMENTS

| | | | |
|---|---|---|---|
| 7,696,980 B1* | 4/2010 | Piot et al. | 345/157 |
| 7,880,726 B2* | 2/2011 | Nakadaira et al. | 345/173 |
| 8,384,675 B2* | 2/2013 | Westerman et al. | 345/173 |
| 2003/0142065 A1* | 7/2003 | Pahlavan | 345/156 |
| 2004/0046732 A1* | 3/2004 | Chesters | 345/156 |
| 2005/0030279 A1* | 2/2005 | Fu | 345/156 |
| 2005/0219223 A1* | 10/2005 | Kotzin et al. | 345/173 |
| 2005/0219228 A1* | 10/2005 | Alameh et al. | 345/173 |
| 2006/0077175 A1* | 4/2006 | Pilu | 345/156 |
| 2006/0176268 A1* | 8/2006 | Oquist et al. | 345/156 |
| 2006/0209014 A1* | 9/2006 | Duncan et al. | 345/156 |
| 2007/0055949 A1* | 3/2007 | Thomas | 715/863 |
| 2007/0075968 A1* | 4/2007 | Hall et al. | 345/157 |
| 2007/0080931 A1* | 4/2007 | Chen et al. | 345/156 |
| 2007/0080933 A1* | 4/2007 | Chen et al. | 345/156 |
| 2007/0080934 A1* | 4/2007 | Chen et al. | 345/156 |
| 2007/0113207 A1* | 5/2007 | Gritton | 715/863 |
| 2008/0174550 A1* | 7/2008 | Laurila et al. | 345/158 |
| 2008/0284731 A1* | 11/2008 | Mak Pui See et al. | 345/161 |
| 2009/0231275 A1* | 9/2009 | Odgers | 345/157 |
| 2009/0273559 A1* | 11/2009 | Rofougaran et al. | 345/156 |
| 2009/0295713 A1* | 12/2009 | Piot et al. | 345/156 |
| 2010/0271458 A1* | 10/2010 | Shethia et al. | 348/14.08 |
| 2011/0190052 A1* | 8/2011 | Takeda et al. | 463/31 |

FOREIGN PATENT DOCUMENTS

| | | | |
|---|---|---|---|
| JP | 2001-236174 | | 8/2001 |
| JP | 2001236174 | * | 8/2001 |
| JP | 2004-199145 | | 7/2004 |
| KR | 10-2000-0074397 A | | 12/2000 |
| KR | 2003-71330 | | 9/2003 |
| KR | 1020030071330 | * | 9/2003 |
| KR | 2004-16690 | | 2/2004 |
| KR | 10-2006-0069985 A | | 6/2006 |
| WO | 2006/068357 A1 | | 6/2006 |

* cited by examiner

UNIVERSAL INPUT DEVICE

CROSS-REFERENCE TO RELATED APPLICATION

This application claims priority from Korean Patent Application No. 2006-100330, filed on Oct. 16, 2006 in the Korean Intellectual Property Office, the disclosure of which is incorporated herein by reference.

BACKGROUND OF THE INVENTION

1. Field of the Invention

An aspect of the present invention relates to a universal input device, and, more particularly, to a universal input device that is mountable to a user.

2. Description of the Related Art

Recently, a portable computer system that allows for an abbreviation of some of the functions of a keyboard and a mouse has been developed to refine an external appearance of the computer system and to be portable. Such a portable computer system has an additional input device to receive various inputs. The additional input device is attached to a part of a user's body to perform a function (i.e., writing) and transmits input information to the computer system by a movement of the user.

Since a conventional input device generates the input information and performs an additional function according to a movement of a user, a separate additional movement, which does not correspond to the input information, is required to select the additional function. Moreover, if the movement corresponding to the additional function is not precisely inputted, the conventional input device may receive information that was not intended to be received by the user and may not perform the additional function.

If the input device comprises a universal input device which may be used with various electronic devices (i.e., a TV set or an audio system) as a remote controller as well as a keyboard and a mouse in the portable computer system, a user is generally required to perform a predetermined movement corresponding to a mode change to change a mode to be recognized by respective devices. This may cause inconvenience to a user and may not efficiently change the mode and deliver the user desired function.

SUMMARY OF THE INVENTION

Accordingly, an aspect of the present invention provides a universal input device which has a contact detector detecting a contact between the contact detector and a target and a casing shaped like a ring to change a mode and to select a menu as a result of contacts between the target and the contact detector without difficulty.

The foregoing and/or other aspects of the present invention can be achieved by providing a universal input device, comprising: a motion detector to detect motion of the target, a contact detector to detect types of contacts with the target, a controller to generate position data corresponding to the motion and control data, including mode setting data to set a mode of the device, corresponding to the types of the contacts, a communicator which transmits the position and the control data to an external host device, and a casing, accommodating the motion detector, the contact detector, the communicator, and the controller, into which the target is inserted.

According to the embodiment of the present invention, the contact detector comprises a plurality of joints which is bent corresponding to the ring shape.

According to the embodiment of the present invention, the universal input device further comprises a storage part, wherein the motion detector further comprises a pattern detector to detect a predetermined input pattern, and the controller transmits input data corresponding to a preset pattern to the external host device if a pattern detected by the pattern detector according to the detected motion is the same as the preset pattern stored in the storage part.

According to the embodiment of the present invention, the controller generates at least one of two-dimensional position data and three-dimensional position data according to a preset mode and transmits the generated position data to the external host device if the motion is detected.

According to the embodiment of the present invention, the casing comprises an elastic member with which the detecting target is elastically connected.

According to the embodiment of the present invention, the contact detector comprises a first contact detector and a second contact detector, and the controller controls the contact detector and the communicator to generate input data corresponding to a predetermined menu selection if the first contact detector detects the contact and generate input data corresponding to a predetermined menu display if the second contact detector detects the contact, and to transmit each input data to the external host device.

According to the embodiment of the present invention, the controller generates different control data according to a position of the detecting target.

According to the embodiment of the present invention, the controller generates different control data according to a contact time of the detecting target with respect to the second contact detector.

According to the embodiment of the present invention, the controller generates control data so that the universal input device is recognized as one of a keyboard, a mouse and a remote controller by a contact of the second contact detector.

According to the embodiment of the present invention, the controller generates position data symmetrical to a predetermined axis according to a preset mode and transmits the position data to the external host device.

According to the embodiment of the present invention, the universal input device further comprises a power supply to supply power to the universal input device, wherein the controller controls the power supply to supply power to the motion detector, the contact detector and the communicator.

According to the embodiment of the present invention, the universal input device further comprises a switch to supply or cut off the power from the power supply according to a connection or a disconnection of the detecting target with respect to the universal input device.

According to the embodiment of the present invention, the switch is provided between the power supply and the casing.

According to the embodiment of the present invention, the communicator communicates through a wireless protocol.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
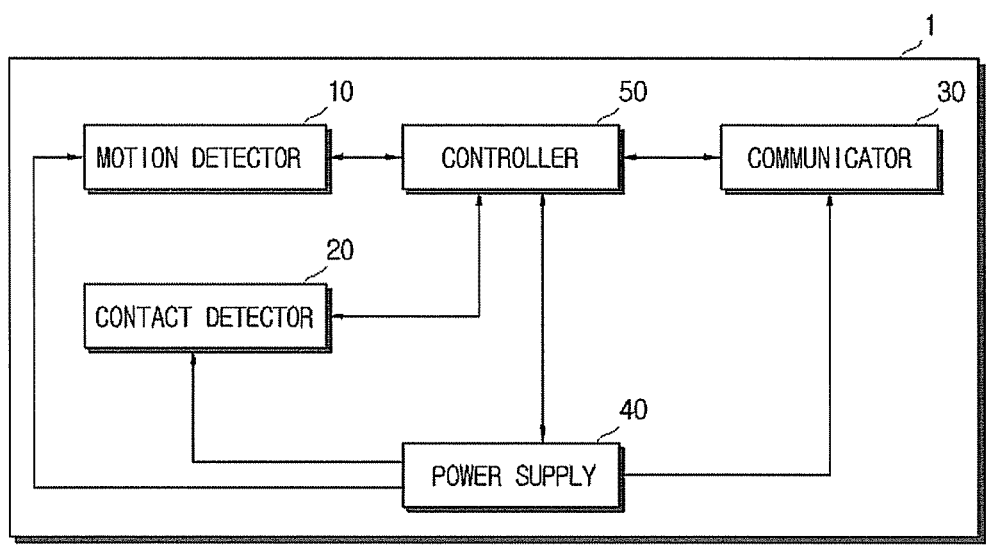
FIG. 1 is a control block diagram of a universal input device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a configuration of a universal input device 1 according to an embodiment of the present invention. As shown in FIG. 1, the universal input device 1 comprises a motion detector 10, a contact detector 20, a communicator 30, a controller 50 and a casing 2, and further comprises a power supply 40. The casing 2 accommodates the motion detector 10, the contact detector 20, the communicator 30, the power supply 40 and the controller 50, and further accommodates the power supply 40. In an embodiment of the invention that will be described in greater detail below, the casing 2 is shaped like a ring into which a detecting target is inserted.

The motion detector 10 detects a motion of the detecting target. The motion detector 10 comprises resistors that each face in different directions and a capacitor in a center part thereof. The motion detector calculates an acceleration of the universal input device 1 in x, y and z directions according to a movement of the capacitor that results from the motion of a user by inertia. The motion detector 10 detects motion in three-dimensions via two circuits which are arranged perpendicularly with respect to each other. The motion detector 10 may alternatively comprise a fluid to detect the motion of the detecting target that results from the motion of the fluid.

The motion detector 10 further comprises a pattern detector (not shown) which detects a predetermined input pattern. While being controlled by the controller 50, the pattern detector transmits input data corresponding to a preset pattern to an external host device if the motion of the universal input device 1 is substantially similar to that of a preset pattern stored in a storage part (not shown). For example, if the storage part stores input data of a message saying, "I love you," which corresponds to a user making a heart shape motion and this motion is detected, the input data of "I love you" is generated and transmitted to the external host device. The input data stored in the storage part may, of course, be added, changed and removed.

Under the control of the controller 50, the motion detector 10 generates two dimensional data (x, y coordinates) and/or three-dimensional data (x, y, and z coordinates) through the motion detected according to a preset mode. If the external host device requires three-dimensional input data, the input data is transmitted thereto through the universal input device 1. Similarly, if the external host device requires two-dimensional input data, the input data is transmitted thereto through the universal input device 1.

The contact detector 20 detects a contact between the contact detector and the detecting target. The contact detector 20 comprises a first contact detector 20a (see FIG. 2B) which generates input data corresponding to a selection of a predetermined menu upon a first type of contact with the target and a second contact detector 20b (see FIG. 2B) which generates input data corresponding to a display of the predetermined menu upon a second type of contact with the target. The detail of the contact detector 20 will be described later.

The communicator 30 transmits position data calculated by the motion detector 10 and control data calculated by the contact detector 20, to the external host device. According to an embodiment of the invention, the communicator 30 comprises a wireless communication module (i.e., Bluetooth, Zigbee, ultra wide band (UWB), etc.). Alternatively, the communicator 30 may comprise a wired communication module.

The power supply 40 supplies power to the motion detector 10, the contact detector 20, the communicator 30 and the controller 50. The power supply 40 may comprise a small mercury cell or another suitable power generation element.

The universal input device 1 comprises a switch to supply power when the universal input device 1 is connected with the detecting target, and to cut off power when the universal input device 1 is disconnected with the detecting target. Thus, the power supply 40 efficiently supplies power to the motion detector 10, the contact detector 20, the communicator 30 and the controller 50. The switch may be provided between the power supply 40 and the casing 2 or another suitable position.

The controller 50 generates the position data corresponding to the detected motion of the universal input device 1 when the motion detector 10 detects the motion and the control data corresponding to the detected contact when the contact detector 20 detects the contact. The controller 50 then controls the communicator 30 to transmit the position data and the control data to the external host device. The controller 50 may comprise a microcomputer and software to execute these operations.

If the universal input device 1 is recognized as a keyboard, the controller 50 estimates x, y and z components of the acceleration of the universal input device 1 detected by the motion detector 10 and calculates the motion of the detecting target according to the estimated value to determine whether a predetermined text or symbol exists. If the predetermined text or symbol exists, the controller 50 transmits the input data to the external host device through the communicator 30.

Though the controller 50 determines a type of a user input by the motion detected by the motion detector 10 regardless of mode changes among, for example, the additional capital letters, lowercase letters and special keys, the controller 50 also determines and transmits the control data corresponding to the mode change when either or both of the first contact detector 20a and the second contact detector 20b detect contacts with the detecting target. For example, if the first contact detector 20b detects the contact, the controller 50 may change the mode from, for example, capital letters to lowercase letters and special keys.

If the universal input device 1 is recognized as a mouse, the controller 50 calculates information on coordinates x and y according to motion information detected by the motion detector 10 and transmits the information to the external host device through the communicator 30. As described above, if the external host device requires the three-dimensional input data of coordinates x, y and z, the controller 50 generates the three-dimensional data according to the motion of the detecting target based on the preset mode, and transmits the data to the external host device.

According to an embodiment of the invention, the controller 50 generates the control data corresponding to a left button of the mouse when the first contact detector 20a detects a contact with the detecting target and generates the control data corresponding to a right button of the mouse when the second contact detector 20b detects a contact with the detecting target. The controller 50 then transmits the generated data to the external host device through the communicator 30. The controller 50 also transmits the control data corresponding to a button of the mouse by a certain motion of the detecting target.

According to another embodiment of the invention, the controller 50 generates different control data depending on contact time of the first contact detector 20a or the second contact detector 20b. For example, if the second contact detector 20b detects the contact between the second contact detector 20b and the detecting target for a short time, the controller 50 generates the control data corresponding to the right button of the mouse. If the second contact detector 20b detects the contact for a long time, the controller 50 generates the control data to change the mode of the universal input device 1 from acting like the mouse to acting like other input devices (i.e., a keyboard and a remote controller).

The controller 50 generates input data that is symmetrical to a predetermined axis according to the preset mode and transmits the data to the external host device through the communicator 30 before the motion of the detecting target is detected. Thus, the preset mode may be changed to generate symmetrical input data for left-handed or right-handed users.

If the universal input device 1 is recognized as a remote controller and if the motion corresponding to a number by the detecting target is detected, the controller 50 generates input data corresponding to the number and transmits the data to the external host device through the communicator 30. If the first contact detector 20a detects a contact between the first contact detector 20a and the detecting target, the controller 50 generates control data to adjust volume or brightness of the external host device depending on the contact-detected position and transmit the data to the external host device.

While the contact detector 20, the communicator 30 and the controller 50 have been described as separate elements, these features may be integrally connected to each other in varying combinations. As one alternative embodiment, the contact detector 20, the communicator 30 and the controller 50 may be realized as a single element.

Figure 2A:
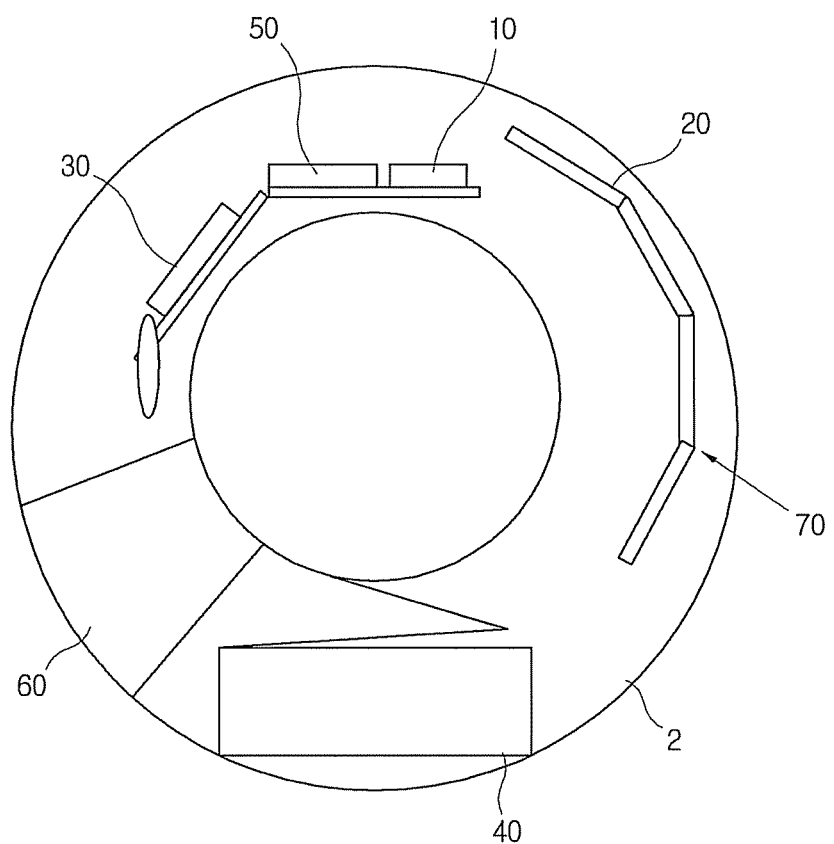
FIG. 2A is a plan-sectional view of the universal input device according to an embodiment of the present invention.
Figure 3:
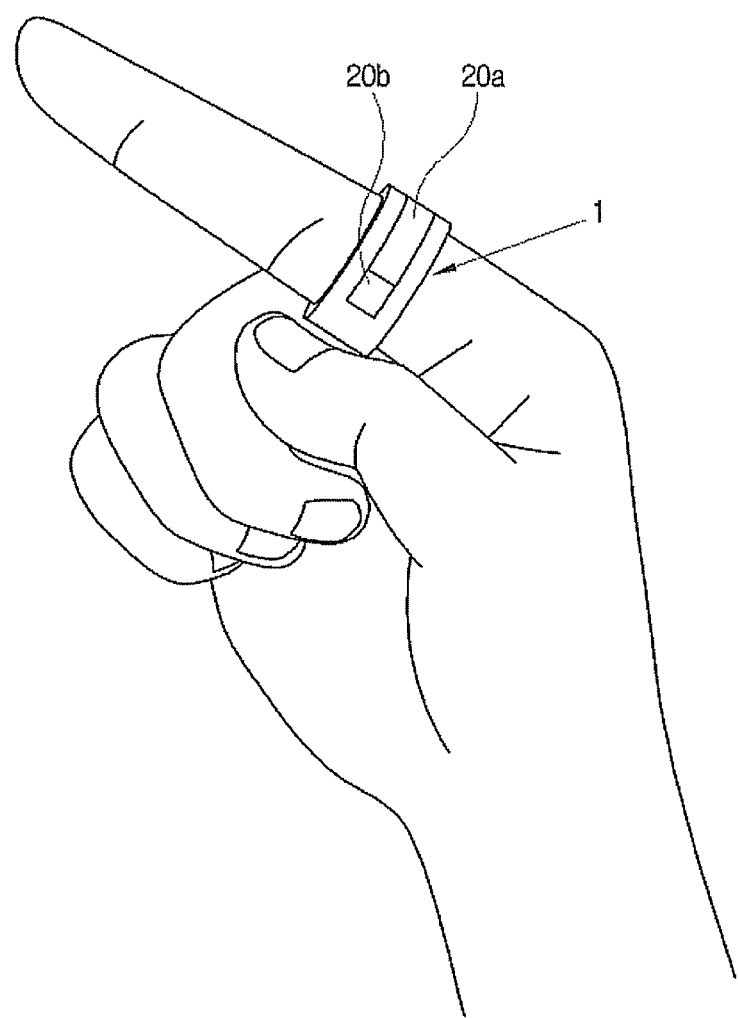
FIG. 3 is a perspective view of the universal input device according to an embodiment of the present invention.

FIG. 2A is a plan-sectional view of the universal input device 1 according to an embodiment of the present invention. As shown in FIG. 2A, the universal input device 1 comprises the casing 2, which accommodates the motion detector 10, the contact detector 20, the communicator 30, the power supply 40 and the controller 50. The casing 2 comprises an elastic member 60 to be elastically connected with the detecting target. As shown in FIGS. 2A and 3, a particularly useful detecting target would be an individual's finger and the embodiments of the universal input device 1 shown in these FIGS. are drawn with that detecting target in mind. However, it is noted that other detecting targets could be used and that alternative constructions of the universal input device 1 that correspond to those other detecting targets are possible.

Figure 2B:
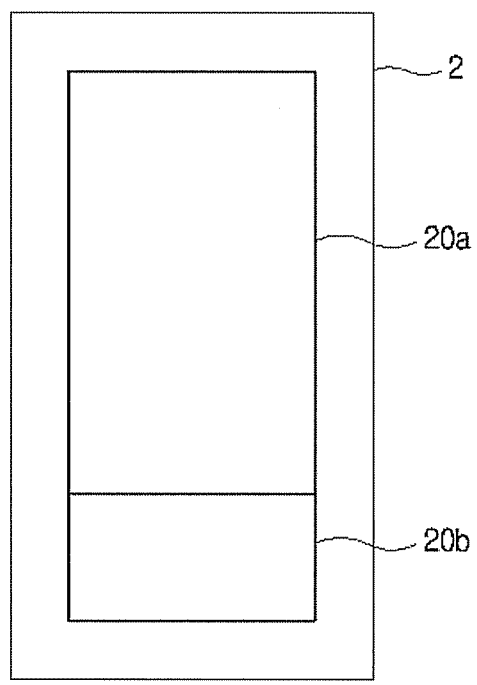
FIG. 2B is a lateral-sectional view of the universal input device according to an embodiment of the present invention.

FIG. 2B is a lateral-sectional view of the universal input device 1 according to an embodiment of the present invention. As shown in FIG. 2B, the contact detector 20 comprises the first contact detector 20a and the second contact detector 20b. The first contact detector 20a may comprise a plurality of sensors to detect an exact contact position of the detecting target.

The contact detector 20 comprises a plurality of joints 70 (illustrated as the curved structure of the casing) and generates different control data according to a position of the joints detecting the contact. Thus, various input data may be generated by simple contact as well as a motion of the user, to be transmitted to the external host device.

FIG. 3 is a perspective view of the universal input device according to an aspect of the present invention.

As shown in FIG. 3, the casing 2 is shaped like a ring into which the detecting target is inserted. However, the casing 2 may have other shapes. As alternative embodiments, the casing 2 may also have an oval or polygonal shape. Thus, the input data can be generated by the detecting target connected with the casing 2 without difficulty regardless of a user's body and a size of a tool. The contact detector 20 may contact a user's body with such a shape.

Figure 4:
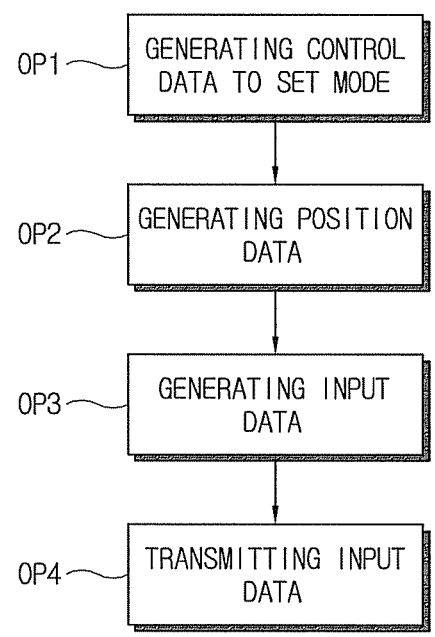
FIG. 4 illustrates a method of operating a universal input device.

FIG. 4 illustrates a method of operating a universal input device in accordance with an embodiment of the invention. As shown in FIG. 4, the method comprises generating control data to set a mode of the device by detecting a predetermined contact with respect to the device (operation 1); generating position data in accordance with an acceleration of the device in space (operation 2); generating input data in accordance with the position data and any contacts with respect to the device following the predetermined contact (operation 3); and transmitting the input data to an external host apparatus corresponding to the mode of the device (operation 4).

In accordance with an aspect of this embodiment, the method may be embodied as a computer readable medium having programs stored thereon to execute the method.

As is described above, an aspect of the present invention provides a universal input device which performs various inputs through a simple motion and contact and is relatively easily mountable to a user. Also, an aspect of the present invention provides a universal input device which generates input data according to a motion and control data by a contact with respect to space and provides input data to various external host devices with high expansibility.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A universal input device to attach to a target of a user, comprising:
   a casing shaped like a ring into which the target is inserted;
   a motion detector for detecting motion of the target;
   a contact detector for detecting various types of contacts with the target;
   a power supply for supplying power to the universal input device;
   a switch for supplying power from the power supply to the universal input device when the target is inserted and connected to the casing, and for cutting off power from the power supply when the target is disconnected from the casing; and
   a controller for generating position data corresponding to motion data and control data, wherein the control data comprises function setting data to change a function of the universal input device from a function of one type of input device to a function of another type of input device, based on the type of contact with the contact detector,
   wherein the contact detector comprises a first contact detector and a second contact detector,
   wherein, when the time of the detected contact between the target and at least one of the first contact detector and the second contact detector is less than a predetermined time, the controller generates the control data based on a current function of the universal input device, and
   wherein, when the time of the detected contact between the target and at least one of the first contact detector and the second contact detector is greater than a predetermined time, the mode of the universal input device is changed.

2. The universal input device according to claim 1, further comprising a communicator for transmitting the position and the control data to an external host device.

3. The universal input device according to claim 2, wherein the casing accommodates the motion detector, the contact detector, the communicator, and the controller.

4. The universal input device according to claim 3, wherein the contact detector comprises a plurality of joints, the plurality of joints being bent to correspond to the ring shaped casing.

5. The universal input device according to claim 2, wherein the contact detector comprises a first contact detector and a second contact detector, and wherein the controller generates position and control data corresponding to a predetermined menu selection if the first contact detector detects a first type of contact between the first contact detector and the target and generates position and control data corresponding to a predetermined menu display if the second contact detector detects a second type of contact between the second contact detector and the target, and controls the communicator to transmit the data.

6. The universal input device according to claim 5, wherein the controller generates different control data according to a position of the target with respect to the types of the contact between the target and the first and second contact detectors.

7. The universal input device according to claim 5, wherein the function setting data allows the universal input device to be recognized as one of a keyboard, a mouse and a remote controller based on the type of contact with the second contact detector.

8. The universal input device according to claim 2, wherein the communicator communicates through a wireless protocol.

9. The universal input device according to claim 1, further comprising a storage unit, wherein the motion detector comprises a pattern detector for detecting an input pattern corresponding to the motion, and wherein the controller generates the position data corresponding to a preset pattern stored in the storage unit to be transmitted to the external host device if the detected pattern is substantially similar to the preset pattern.

10. The universal input device according to claim 1, wherein the position data is either two-dimensional position data or three-dimensional position data according to a preset function corresponding to the function setting data.

11. The universal input device according to claim 1, wherein the casing comprises an elastic member to allow the target to be inserted into the casing.

12. The universal input device according to claim 1, wherein the controller generates position data symmetrical to a predetermined axis according to a preset function and transmits the position data to the external host device.

13. The universal input device according to claim 1, wherein the switch is provided between the power supply and the casing.

14. The universal input device according to claim 1, wherein, if the universal input device is recognized as a keyboard, the controller estimates x, y and z components of the motion to determine whether a predetermined text or symbol is being traced by the target.

15. The universal input device according to claim 1, wherein, if the universal input device is recognized as a mouse, the controller calculates x and y components of the motion.

16. The universal input device according to claim 1, wherein the control data corresponds to either a left or a right mouse button.

17. The universal input device according to claim 16, wherein the control data corresponds to either a left or a right mouse button based on whether a long contact or a short contact is detected.

18. A method of operating a universal input device including a casting shaped like a ring into which a target is inserted for use with an external host, comprising:
supplying power, by a switch, from a power supply to the universal input device when the target is inserted and connected to the casing, and cutting off power, by the switch, from the power supply when the target is disconnected from the casing;
generating control data to change a function of the universal input device from a function of one type of input device to a function of another type of input device by detecting a predetermined contact with a contact detector of the universal input device such that the universal input device is operable with the external host;
generating position data in accordance with an acceleration of the universal input device in space;
generating input data in accordance with the position data and any contacts with respect to the universal input device following the predetermined contact; and
transmitting the input data to the external host,
wherein the contact detector comprises a first contact detector and a second contact detector,
wherein, when the time of the detected contact between the target and at least one of the first contact detector and the second contact detector is less than a predetermined time, a controller generates the control data based on a current function of the universal input device, and
wherein, when the time of the detected contact between the target and at least one of the first contact detector and the second contact detector is greater than a predetermined time, the mode of the universal input device is changed.

19. A circuit of a universal input device for use with an external host to attach to a target of a user, the circuit comprising:
a motion detector for detecting motion of the target;
first and second contact detectors to detect first and second contacts with the target;
a power supply for supply power to the universal input device;
a switch for supplying power from the power supply to the universal input device when the target is inserted and connected to the casing, and for cutting off power from the power supply when the target is disconnected from the casing; and
a controller for generating position data corresponding to the motion and control data, wherein the control data comprises function setting data to change a function of the universal input device from a function of one type of input device to a function of another type of input device, based on the type of the contact with the contact detector,
wherein, when the time of the detected contact between the target and at least one of the first contact detector and the second contact detector is less than a predetermined time, the controller generates the control data based on a current function of the universal input device, and
wherein, when the time of the detected contact between the target and at least one of the first contact detector and the second contact detector is greater than a predetermined time, the mode of the universal input device is changed.

* * * * *